United States Patent Office 3,828,099
Patented Aug. 6, 1974

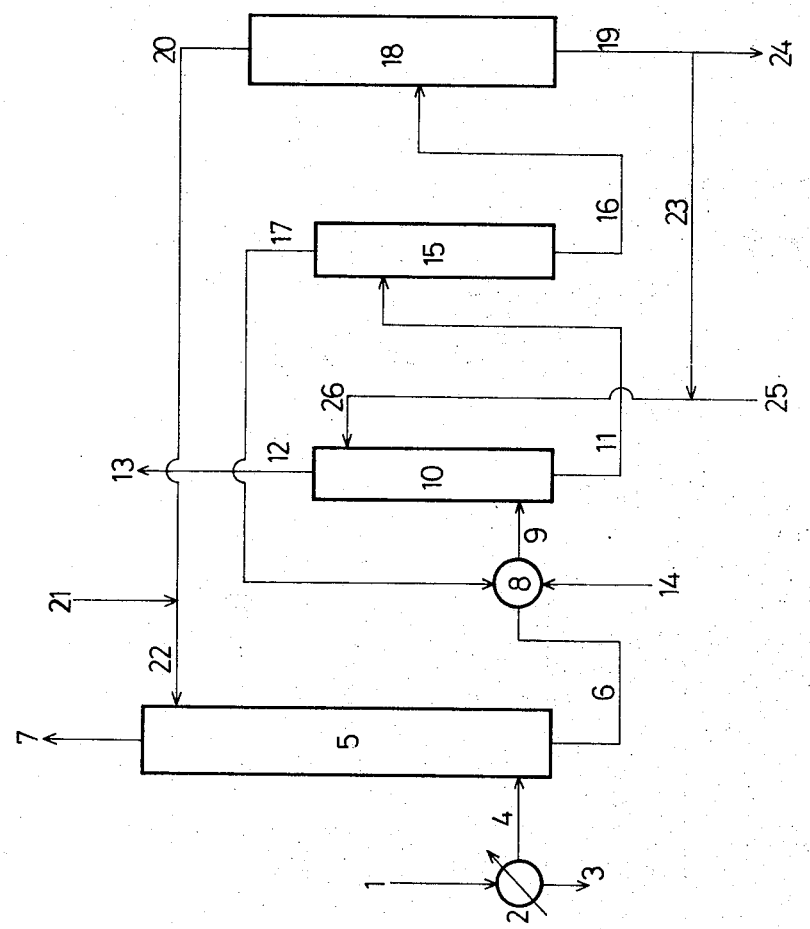

3,828,099
PROCESS FOR SEPARATING METHACROLEIN
Ryozi Sato and Yoshio Ito, Yokohama, Japan, assignors to The Japanese Geon Co., Ltd., Tokyo, Japan
Filed Mar. 2, 1971, Ser. No. 120,276
Claims priority, application Japan, Mar. 4, 1970, 45/17,983
Int. Cl. C07c 47/20
U.S. Cl. 260—601 R
9 Claims

ABSTRACT OF THE DISCLOSURE

A method for separating methacrolein from a gaseous mixture thereof by absorbing the methacrolein with an organic solvent and then extracting the organic solvent from the resulting solution with water.

---

This invention relates to a process for separating methacrolein from a gas mixture containing methacrolein.

Particularly, the invention pertains to a process for the separation of methacrolein from a reaction mixture obtained by the vapor phase catalytic oxidation of isobutylene or a $C_4$ hydrocarbon mixture composed mainly of isobutylene. Further the present invention is applicable to a process for the recovery of unreacted methacrolein from a reaction mixture resulting from the vapor phase catalytic oxidation of methacrolein to produce methacrylic acid.

Recently, processes for producing methacrolein and methacrylic acid, which are extremely useful compounds, have been studied and developed. For example, isobutylene or methacrolein is mixed with oxygen, nitrogen and steam, and the resulting mixutre is oxidized at 350° to 550° C. in the presence of a catalyst to produce the desired methacrolein or methacrylic acid. In this case, however, the gaseous reaction mixture obtained comprises, in addition to methacrolein or methacrylic acid, unreacted isobutylene or unreacted methacrolein, unreacted oxygen and large amounts of nitrogen and steam, and by-products such as $C_1$-$C_4$ aldehydes, fatty acids, ketones, carbon dioxide, and carbon monoxide. In order to separate methacrolein from said gaseous reaction mixture, there is frequently adopted such a procedure wherein the gaseous reaction mixture is washed with water with cooling to dissolve the methacrolein therein and then the resulting aqueous solution is subjected to distillation to separate the methacrolein therefrom. In the above case, however, the amount of water required is extremely large, so that the concentration of the desired substance after water-washing is low and the separation of methacrolein in the subsequent step requires a large scale distillation means. Moreover, the amounts of heating steam and cooling water used are also increased resulting in great economical disadvantages.

Further, most of the aforesaid reaction by-products usually form azeotropic mixtures with water and are similar in boiling point, in general, so that the separation of methacrolein becomes more difficult and, at the same time, unstable methacrolein is likely to be exposed to high temperatures. Accordingly, there result various disadvantage, e.g., the yield of methacrolein is decreased, due to polymerization, and the columns, pipes, rotary means and the like are liable to be clogged due to deposition of insoluble polymerization products which make the operation impossible. For the above reasons, has been desired to develop a commerically advantageous process for the separation and recovery of metacrolein. The object of this invention is to obtain methacrolein from such a gas mixture on a commercially feasible basis.

As the result of extensive studies, we have found that such a process as mentioned below, in which the low water-solubility of methacrolein is advantageously utilized, is quite preferable for the separation of unstable methacrolein.

In accordance with the present invention, there is provided a process for separating methacrolein from a gas mixture containing methacrolein, characterized in that the methacrolein in the gas mixture is absorbed by an organic solvent capable of forming a solution at normal temperatures together with each of water and methacrolein in optional proportions. The organic solvent is extracted from the resulting solution using a liquid-liquid extraction using water as an extracting reagent thereby to separate the methacrolein as an extraction residue phase.

Methacrolein-containing gas is usually obtained as a high temperature gas mixture by the gas phase catalytic oxidation of isobutylene or an isobutylene-containing hydrocarbon mixture. It is also obtained when the recovery of unreacted methacrolein is intended subsequent to the gas phase catalytic oxidation of methacrolein for the production of methacrylic acid.

The aforesaid high temperature reaction gas mixture is cooled by a suitable means to divide the gas mixture into a liquid phase in which have been condensed or dissolved, major portions of steam, methacrylic acid (by-product), and slight amounts of other organic acids aldehydes and ketones, and a gas phase which comprises uncondensed steam, nitrogen, oxygen, carbon dioxide, carbon monoxide, unreacted isobutylene and the like hydrocarbons, and major portions of aldehydes composed mainly of methacrolein. The present invention is advantageously applied to said gas phase to separate the methacrolein.

The gas phase product obtained by the above-mentioned cooling treatment, is absorbed preferably under pressure and at a low temperature, in an organic solvent capable of forming a solution at normal temperature together with each of methacroelin and water in optional proportions, thereby separating the methacrolein from the gas. Preferable as the absorption solvent used in the above-mentioned separation process are, for example, methyl alcohol, ethyl alcohol, isopropyl alcohol, n-propyl alcohol, acetone and acetonitrile. These may be used either singly or in admixture of two or more. The gas phase after separation of methacrolein is introduced, if necessary, to a step for recovering residual unreacted isobutylene and othed hydrocarbons to recover them by a suitable operation such as absorption, distillation and the like.

After absorption of methacrolein by use of a solvent and before feeding of the resulting solution to an extraction zone, it is desirable for the subsequent isolation of methacrolein that the concentration of methacrolein is controlled to at least 40% by weight, preferably at least 50% by weight.

Thereafter, the organic solvent, which has been used for the absorption, is extracted from the resulting methacrolein-containing solution by use of water as an extracting reagent, utilizing the fact that methacrolein is extremely low in solubility in water, whereby the methacrolein is separated and recovered as an extraction residue, which may, if necessary, be subjected to further purification.

Selectivity values of the above-exemplified organic solvents to be extracted from the methacrolein-containing solution by use of water, are such that in case the amount of water is about 80% by weight for example, methyl alcohol 29, ethyl alcohol 17, isopropyl alcohol 7, acetone 4 and acetonitrile 5. Thus it is understood that the extraction by use of water is effective. Further, a ternary system comprising the said organic solvent, methacrolein and water forms a relatively broad homogeneous phase, so that the above absorption of methacrolein and accompanying steam can efficiently be carried out.

On the other hand, the extraction phase (aqueous solution), which contains the organic solvent and part of the methacrolein, is treated according to an ordinary procedure to separate the methacrolein and the organic solvent, and the former is recycled to the liquid-liquid extraction zone, while the latter, after purification, if necessary, is reused as the absorption solvent for methacrolein. Further, the residual water may be reused as an extracting reagent for the above liquid-liquid extraction.

What is advantageous is that the methacrolein entrained in the aqueous solution is higher in volatility than acetone and methyl alcohol having lower boiling points than methacrolein, so that a methacrolein-rich distillate is separated by mere distillation and is recycled to the liquid-liquid extraction zone, whereby the recovery of methacrolein in the extraction phase can be easily effected. It is well known that in aqueous solutions, aldehydes which are hydrophobic are higher in volatility than alcohols which are hydrophilic, in general. It would therefore be understood that the above-mentioned tendency is observed also in the case of methacrolein, which posesses a low solubility in water.

In contrast thereto, the use of an organic solvent having a low solubility for methacrolein and water brings about undesirable results such as a decrease in methacrolein absorption efficiency, increase in the amount of organic solvent used, necessity of equipment suitable for severe dehydration, decrease in extraction efficiency in liquid-liquid extraction and, in some cases, impracticability of the extraction operation.

The separation of water and the organic solvent may be effected according to such a procedure thoroughly known to those skilled in the art. For example, ordinary distillation, or azeotropic distillation using an entrainer, such as, benzene, trichloroethylene or isopropyl ether, or extractive distillation. In view of the fact that the dehydration is not particularly required to be strict in the invention, the separation is easily accomplished by the ordinary distillation.

It has heretofore been considered that alcohols, when used in combination with aldehydes, give rise to undesirable reactions and hence are not preferable as solvents to be used in such cases. However, it has been found that under the operational conditions of the present invention, alcohols can be used without substantially injuring the stability of methacrolein. This point also is a great characteristic of the present invention.

Acrolein, which is a useful aldehyde like methacrolein, is several times greater in water solubility than methacrolein, so that the selectivity thereof is extremely low as compared with that of methacrolein, and is, for example, about 1.5 in the case of an acrolein-methyl alcohol-water-system. From this, it is clear that the application of the present process to acrolein is not always advantageous. Thus, it may be said that the present invention is characteristically applied to methacrolein.

According to the present process, methacrolein is separated by liquid-liquid extraction carried out at below normal temperature, and the recovery and recycle of methacrolein, which has partly been entrained in the extraction phase, may sufficiently be carried out by simple distillation similar to equilibrium distillation, so that the residence time of methacrolein in the column is short and undesirable reactions of methacrolein are decreased. Thus, all the operations are effected under circumstances advantageous for maintaining the stability of methacrolein to give such desirable results as decrease in the amount of polymerization inhibitor used, increase in recovery yield, and substantial avoidance of clogging and contamination of apparatuses, interruption of operations, and the like. Further, both the extraction and distillation columns can be made easily operable and low in cost to result in further savings in cost and labor.

In the case of the methacrolein absorption zone of the present invention, the amount of uncondensed steam entrained in the gas mixture entering the zone is not required to be strictly limited. This allows the gas cooling equipment to be of simpler design and inhibits the loss of methacrolein due to escape into the condensed water.

As mentioned above, the present invention provides a process for separating methacrolein which is commercially and economically advantageous and characteristically applicable.

The present invention is explained further with reference to the accompanying drawing, which is a flow sheet showing an embodiment of the invention.

In the first place, a high temperature gaseous reaction mixture (1), which has been formed by the gas phase catalytic oxidation of isobutylene or an isobutylene-containing hydrocarbon mixture, or methacrolein in the presence of oxygen, nitrogen and steam, is cooled by a suitable cooling means, e.g. an indirect heat exchanger (2). The condensed liquid phase comprising a major proportion of the steam and methacrylic acid and the like high boilings is separated, and withdrawn through a pipe (3) and, if necessary, the components dissolved therein may be recovered. The resulting gas phase is sent, preferably at below about 50° C., through a pipe (4) to the lower part of a methacrolein absorption column (5).

In the absorption column (5), the absorption of methacrolein is effected under a high pressure and at a low temperature, preferably under 1 to 10 atm. and at normal temperature (under high pressure) to −30° C. At the absorption solvent, the solvent recovered from a distillation column (18) is used, if necessary after purification. The solvent is charged in a desired amount, if necessary together with a proper amount of a polymerization inhibitor which may be added from a pipe (21) through a pipe (22) to near the top of the absorption column (5).

The amount of the feed gas is variable within a wide range depending on the concentrations of the gas phase reaction mixture, particularly methacrolein, the pressure in the system, the temperature of the solvent and the structure of the column. Generally, however, the amount is about 500 to 20,000 liters per liter of the solvent, and it is desirable to select such operational conditions such that the gas is treated in an amount as large as possible to increase the concentration of methacrolein at the bottom of the column.

Depending on the methacrolein concentration of the solution withdrawn through a pipe (6) from the bottom of the absorption column (5), a suitable amount of methacrolein may be additionally fed through a pipe (14). Further, the distillate from a recovery column (15) may be also returned through a pipe (17) to a suitable composition-adjusting portion (8). In the above manner, the composition of the solution fed through a pipe (9) to near the bottom of an extraction column (10) can be adjusted so as to be in conform to the operational conditions of the extraction column. The extraction column may be any type of ordinary extraction columns such as a packed column, plate column, disk rotating column or the like, and is preferably operated at 0° to 40° C.

Water as the extracting reagent is fed through a pipe (26) to near the top of the extraction column (10). This water comes from the bottom of the distillation column (18) through pipes (19) and (23). In this water, however, polymerization products and the like accumulate gradually, so that a part of the water is withdrawn through a pipe (24) and discharged out of the system, and a required amount of fresh water is supplemented through a pipe (25).

As the concentration of water in the extraction phase lowers, a detrimental influence on the operation is observed in the density difference, interfacial tension and the like of the phases. It is therefore desirable to determine the amount of fed extracting reagent so that the concentration of water in the extraction phase is maintained at 50% or more. The said amount can be easily inferred by utilization of the liquid-liquid equilibrium relation.

From the top of the extraction column (10), methacrolein is obtained as an extraction residue phase (raffinate) is obtained through a pipe (12). If necessary, the methacrolein may be sent to a suitable step (13) for further purification.

The aqueous solution forming the extraction phase is sent through a pipe (11) to the recovery column (15) and distilled at normal pressure or under reduced pressure, and a distillate sufficiently rich in methacrolein is obtained from the feed solution (extraction phase), whereby substantially all of the methacrolein entrained in the extraction phase can be recovered.

Further, it is desirable that the column bottom is maintained at below about 110° C. and, if necessary, a proper amount of a polymerization inhibitor such as hydroquinone or the like is added to stabilize methacrolein left unrecovered though in a slight amount.

The bottom solution of the recovery column (15) is introduced through a pipe (16) into the distillation column (18) and the solvent is separated from water by distillation. The distillate at the column top is withdrawn through a pipe (20), and recycled as organic solvent into the absorption column (5). If necessary, the distillate may be purified to a desired purity by azeotropic distillation, extractive distillation or the like operation. In case there has been used a solvent, which is higher in boiling point than water and does not form an azeotropic mixture therewith, the solvent is recovered from the column bottom.

The present invention is illustrated below with reference to an example, in which percent showing each composition is mole percent unless otherwise specified.

EXAMPLE

A gaseous reaction mixture, which had been obtained by catalytically oxidizing isobutylene at about 470° to 510° C. in the presence of oxygen, nitrogen, steam and a catalyst, was cooled to about 30° C., whereby a gas phase and an aqueous phase were formed. The aqueous phase was composed of more than 98% of water, about 0.9% of acetic, methacrylic and the like acids, and slight amounts of formaldehyde, acetaldehyde and methacrolein. The gas phase was composed of 6.75% of methacrolein, 0.24% of oxygen-containing organic compounds, 2.68% of unreacted isobutylene, 3.7% of water and, in addition thereto, unreacted oxygen, carbon dioxide, carbon monoxide and a large amount of nitrogen.

The above-mentioned gas phase was introduced into the methacrolein absorption column (5), and about 4 liter/hr. of methyl alcohol cooled to −25° C. was fed through near the top of the column to absorb the methacrolein. The absorption column was about 150 mm. in inner diameter and about 4 m. in length, and had been packed with ½ inch Raschig rings. The operation was effected while keeping the column cool so that the column bottom was maintained at about 5° C.

The average methacrolein concentration of the bottom solution obtained was about 27% (corresponding to about 47% by weight), and 98 to 99% of the methacrolein in the feed gas was separated.

This solution was adjusted so as to maintain a methacrolein concentration of 60% by weight, while initially adding methacrolein alone and later in combination with the distillate of the recovery column (15), and fed at a rate of 1,320 g./hr. to the extraction column (10). In this case, 200 p.p.m. of hydroquinone was used as a polymerization inhibitor.

The extraction column was a packed column of about 40 mm. in inner diameter and 2.5 m. in length, and the average liquid temperature in the column was 23° C. Water as an extracting reagent was fed at a rate of 2,100 g./hr. and counter-currently contacted with the solution to obtain 2,690 g./hr. of an extraction phase and 730 g./hr. of an extraction residue phase from the column bottom and the column top, respectively. The extraction residue phase was composed of 94.5% by weight of methacrolein, 3.0% by weight of methyl alcohol and 2.5% by weight of water and the like, while the extraction phase contained 6.48% by weight of methacrolein and 12.4% by weight of methyl alcohol.

Subsequently, the extraction phase was sent to the recovery column (15), and 200 p.p.m. of hydroquinone was additionally fed. In the recovery column, about ¼ of the whole length of the column was used as a condensation zone. The recovery column was not equipped with a reflux means. The liquid was distilled under normal pressure at an average column bottom temperature of 94° C. The distilled vapor was immediately withdrawn through a water-cooling means. Thus 240 g. of a distillate per 2,690 g. of the feed liquid were obtained. The distillate contained 71.7% by weight of methacrolein. When condensed, a small amount of water was separated, whereby 2 phases were formed. The total distillate was used as a part of the feed liquid in the liquid-liquid extraction system, as mentioned previously.

The bottom residue of the recovery column contained 12.35% by weight of methyl alcohol and, in addition therein, about 800 p.p.m. of methacrolein and a slight amount of a soluble polymer-like substance. The bottom residue was distilled in the distillation column (18) at normal pressure and in a reflux ratio of 3.0 to obtain, per 2,450 g. of the feed liquid, 300 g. of a distillate containing 96.1% by weight of methyl alcohol and 3.3% by weight of water, and 2,150 g. of an aqueous bottom residue containing 1.35% by weight of methyl alcohol.

The methacrolein recovery ratio throughout the whole step was more than 97%.

The present invention is not limited to the above-mentioned example, and can be practiced even when the composition of the gaseous reaction mixture, the kind of the solvent and the operational conditions of each column are varied.

What we claim is:

1. A process for separating methacrolein from a gaseous reaction mixture obtained from the gas phase catalytic oxidation of isobutylene or methacrolein which comprises absorbing the methacrolein in the mixture with an organic solvent selected from the group consisting of methyl alcohol, ethyl alcohol, isopropyl alcohol, n-propyl alcohol, acetone, and acetonitrile, and then extracting the organic solvent from the resulting solution at a temperature from 0° to 40° C. with water to thereby separate the methacrolein as an extraction residue.

2. A process as claimed in claim 1, wherein the organic solvent is methyl alcohol.

3. A process as claimed in claim 1, wherein the gaseous mixture is at a temperature below 50° C. and is obtained by catalytically oxidizing isobutylene or an isobutylene-containing hydrocarbon mixture or methacrolein in gas phase and cooling the resulting high temperature reaction gas.

4. A process as claimed in claim 1, wherein the resulting extraction phase is distilled to recover a part of the methacrolein remaining therein and to obtain an aqueous solution.

5. A process as claimed in claim 4, wherein the aqueous solution is distilled to separate the solvent from the water.

6. A process for separating methacrolein from a gaseous reaction mixture obtained from the gas phase catalytic oxidation of isobutylene or methacrolein which comprises absorbing the methacrolein in the mixture with an organic solvent selected from the group consisting of methyl alcohol, ethyl alcohol, isopropyl alcohol, n-propyl alcohol, acetone, and acetonitrile, adjusting the methacrolein of the resulting solution to a methacrolein content of at least 40% by weight by adding additional methacrolein or recovered methacrolein obtained in the recovery step below, extracting the organic solvent from the resulting solution at a temperature from 0° to 40° C. with water to thereby separate the methacrolein as an extraction residue phase, recovering a part of the methacrolein remaining in the extract by distilling it and recycling the recovered methacrolein into the above adjusting step.

7. A process as claimed in claim 6, wherein the organic solvent is methyl alcohol.

8. A process as claimed in claim 6, wherein the gaseous mixture is at a temperature below 50° C. and is obtained by catalytically oxidizing isobutylene or an isobutylene-containing hydrocarbon mixture or methacrolein in gas phase and cooling the resulting high temperature reaction gas.

9. A process for separating methacrolein from a high temperature gaseous reaction mixture produced by the gas phase catalytic oxidation of isobutylene which comprises (1) cooling the said reaction mixture to a temperature below 50° C. and effecting removal of the condensed liquid phase,
(2) absorbing the methacrolein in the thus cooled gaseous reaction mixture with methyl alcohol,
(3) adjusting the methacrolein concentration of the resulting solution to at least 40% by weight by adding additional methacrolein or recovered methacrolein obtained in the recovery step (5) below,
(4) extracting the methyl alcohol from the solution at a temperature from 0° to 40° C. by adding water to thereby separate the methacrolein as an extraction residue,
(5) recovering a part of the methacrolein remaining in the extract by distillation and recycling the recovered methacrolein to the above step (3), and
(6) distilling the aqueous solution obtained in the above step (5) to thereby separate the methyl alcohol from the water, the methyl alcohol being recycled to the absorption step (2).

References Cited
UNITED STATES PATENTS

| | | | |
|---|---|---|---|
| 3,220,932 | 11/1965 | Crandall | 260—601 R |
| 2,606,932 | 8/1952 | Cole et al. | 260—601 R |
| 2,514,966 | 7/1950 | Pierotti et al. | 260—601 R |
| 2,288,211 | 6/1942 | Schulz | 260—602 |

LEON ZITVER, Primary Examiner

D. B. SPRINGER, Assistant Examiner

U.S. Cl. X.R.

55—37, 46